United States Patent
Jordan, Jr.

(10) Patent No.: US 7,228,334 B1
(45) Date of Patent: Jun. 5, 2007

(54) SYSTEMS METHODS TO SELECTIVELY CONTROL FORWARDING OF ELECTRONIC MAIL

(75) Inventor: Royce D. Jordan, Jr., Lawrenceville, GA (US)

(73) Assignee: Bellsouth Intellectual Property Corp, Wilmington, DE (US)

( * ) Notice: Subject to any disclaimer, the term of this patent is extended or adjusted under 35 U.S.C. 154(b) by 506 days.

(21) Appl. No.: 10/034,093

(22) Filed: Dec. 28, 2001

(51) Int. Cl.
    G06F 15/16 (2006.01)
    G06F 15/173 (2006.01)

(52) U.S. Cl. .................... 709/206; 709/223; 709/224; 709/232

(58) Field of Classification Search ............... 709/206, 709/235, 223, 224, 232; 455/412.1, 466
See application file for complete search history.

(56) References Cited

U.S. PATENT DOCUMENTS

| | | | |
|---|---|---|---|
| 5,559,800 A | | 9/1996 | Mousseau et al. |
| 5,734,901 A * | | 3/1998 | Sidhu et al. ............... 712/220 |
| 5,822,526 A | | 10/1998 | Waskiewicz |
| 5,872,925 A * | | 2/1999 | Han ........................... 709/206 |
| 5,878,230 A * | | 3/1999 | Weber et al. ............... 709/238 |
| 5,958,005 A * | | 9/1999 | Thorne et al. .............. 709/202 |
| 6,021,427 A * | | 2/2000 | Spagna et al. .............. 709/206 |
| 6,035,327 A | | 3/2000 | Buckley et al. |
| 6,118,856 A | | 9/2000 | Paarsmarkt et al. |
| 6,219,694 B1 | | 4/2001 | Lazaridis et al. |
| 6,230,186 B1 * | | 5/2001 | Yaker ........................ 709/206 |
| 6,321,267 B1 | | 11/2001 | Donaldson |
| 6,324,569 B1 * | | 11/2001 | Ogilvie et al. ............. 709/206 |
| 6,442,600 B1 * | | 8/2002 | Anderson .................. 709/217 |
| 6,631,137 B1 * | | 10/2003 | Lorrain et al. ............. 370/401 |
| 6,701,347 B1 * | | 3/2004 | Ogilvie ...................... 709/206 |
| 6,711,608 B1 * | | 3/2004 | Ogilvie ...................... 709/206 |
| 6,721,784 B1 * | | 4/2004 | Leonard et al. ............ 709/206 |
| 6,728,714 B1 * | | 4/2004 | Doganata et al. .......... 707/10 |
| 6,757,713 B1 * | | 6/2004 | Ogilvie et al. ............. 709/206 |
| 6,836,846 B1 * | | 12/2004 | Kanevsky et al. ......... 713/193 |
| 6,842,773 B1 * | | 1/2005 | Ralston et al. ............. 709/206 |
| 6,920,564 B2 * | | 7/2005 | Decuir ....................... 713/189 |
| 6,938,065 B2 * | | 8/2005 | Jain ........................... 709/201 |
| 6,957,248 B2 * | | 10/2005 | Quine et al. ............... 709/206 |
| 7,035,904 B1 * | | 4/2006 | Jordan, Jr. ................. 709/206 |

OTHER PUBLICATIONS

"How Omniva Policy Manager Works," printed from http://ww.omniva.com/what/how.html on Feb. 26, 2002.

(Continued)

Primary Examiner—Ario Etienne
Assistant Examiner—Hussein El-chanti
(74) Attorney, Agent, or Firm—Withers & Keys, LLC

(57) ABSTRACT

A system and method for detecting and selectively preventing the forwarding of an electronic message, wherein the message is sent by a sender to a recipient, and wherein the message has a message body and a message header. The system comprises a wireless gateway in communication with an electronic mail client; a message database in communication with the gateway for storing a first message identifier associated with the electronic message; and a search module in communication with the message database for determining whether a second message identifier associated with a forwarded electronic message is contained in the message database and, if the message database contains the second message identifier, preventing forwarding of the forwarded message.

12 Claims, 4 Drawing Sheets

OTHER PUBLICATIONS

"Certified E-mail Proof-of-Posting/Opening Launched by ReadNotify," URLwire, Oct. 26, 2001.
"About ReadNotify," printed from http://www.readnotify.com/readnotify/about.asp on Dec. 4, 2001.
Oakes, "This Email Will Self-Destruct," wired news, Sep. 21, 2000.
"The Solution for Business Use," printed from http://www.ensuredmail.com/Business2/BusSol/BusSolIR.html on Dec. 18, 2001.
"MailRecall: Secure E-mail for the Enterprise," Authentica, Inc., Sep. 20, 2001.
"MailRecall," printed from http://www.authentica.com/products/mailrecall.asp on Dec. 18, 2001.
"About self-destructing email," printed from http://www.self-destructing-email/self-destructing-email/about.asp on Dec. 17, 2001.
"Self-destructing email FAQ—Questions & Answers," printed from http://www.self-destructing-email/self-destructing-email/faq.asp on Dec. 17, 2001.
"WAP™ Architecture," Wireless Application Protocol Forum Ltd., Oct. 17, 2000.

* cited by examiner

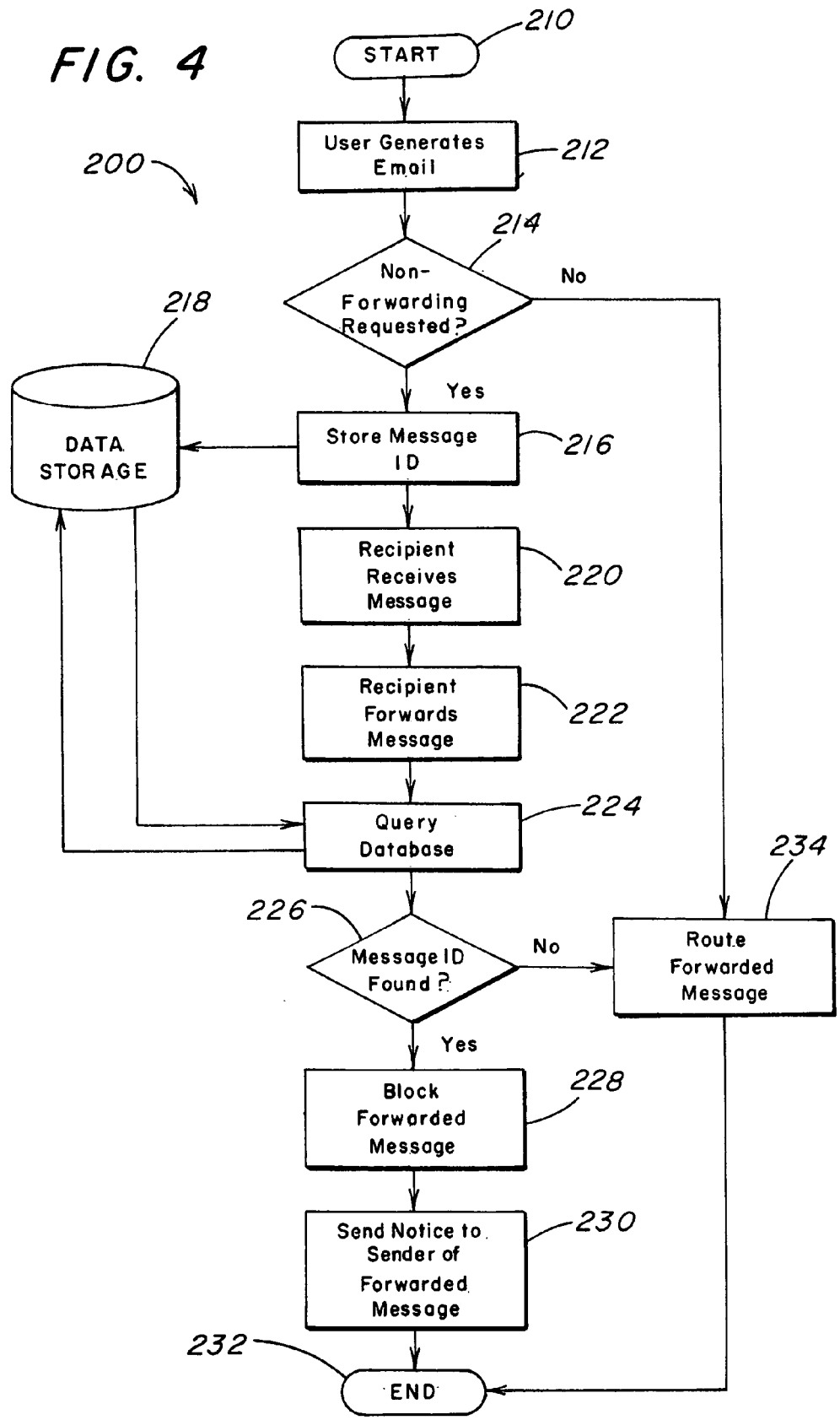

SYSTEMS METHODS TO SELECTIVELY CONTROL FORWARDING OF ELECTRONIC MAIL

BACKGROUND OF THE INVENTION

Email continues to be the fastest growing communication medium for businesses. Using email to transmit sensitive information, however, poses many security issues. Consequently, many business have resorted to perimeter defenses such as firewalls, virtual private networks (VPNs), and intrusion detection systems (IDSs). While these defenses help keep out individuals with malicious intentions, they do not address an obvious security vulnerability: the loss of information through unauthorized forwarding of email.

Accordingly, a system and method is needed to selectively prevent forwarding of email communications. The architecture should provide sufficient flexibility to accommodate a variety of email clients and should not require any plugins or other client software installations. Additionally, the solution should be easily deployed in large-scale environments.

SUMMARY OF THE INVENTION

The present invention is directed to a system and method for detecting and selectively preventing the forwarding of an electronic message, wherein the message is sent by a sender to a recipient, and wherein the message has a message body and a message header. The system comprises a wireless gateway in communication with the client; a message database in communication with the gateway for storing a first message identifier associated with the electronic message; and a search module in communication with the message database for determining whether a second message identifier associated with a forwarded electronic message is contained in the message database and, if the message database contains the second message identifier, preventing forwarding of the forwarded message.

DESCRIPTION OF THE FIGURES

For the present invention to be understood clearly and readily practiced, the present invention will be described in conjunction with the following figures, wherein:

FIG. 4 is a flow diagram of a process to prevent unauthorized forwarding of email messages according to one embodiment of the present invention.

DETAILED DESCRIPTION OF THE INVENTION

It is to be understood that the figures and descriptions of the present invention have been simplified to illustrate elements that are relevant for a clear understanding of the present invention while eliminating, for purposes of clarity, other elements. For example, certain network details and modules of certain messaging platforms are not described herein. Those of ordinary skill in the art will recognize, however, that these and other elements may be desirable in a typical communications network. A discussion of such elements is not provided because such elements are well known in the art and because they do not facilitate a better understanding of the present invention.

The present invention relates to an interactive wireless communications system in which a sender of an electronic mail message can limit, or even prevent, recipients of that message from forwarding the message to other mail clients. The present invention employs a specially configured gateway to control distribution of email among all applications and devices that communicate with the gateway.

Figure 1:
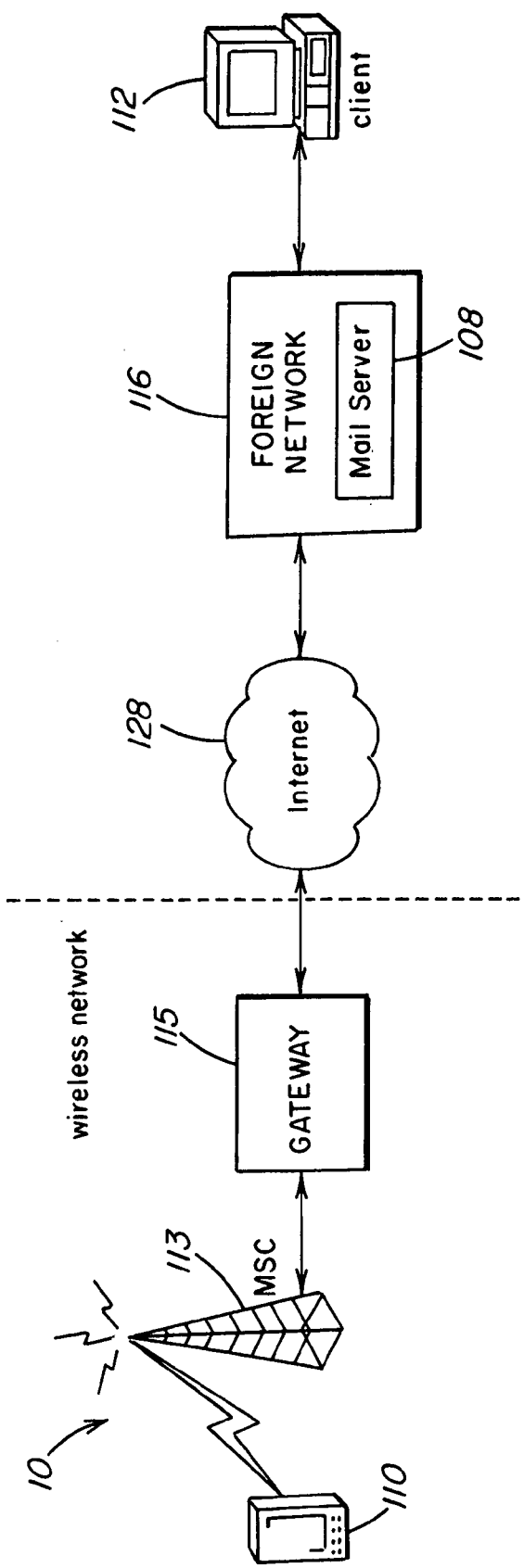
FIG. 1 is a simplified block diagram of an exemplary environment for operation of one embodiment of the present invention.

FIG. 1 is a simplified schematic diagram of a system 10, according to one embodiment of the present invention. The system 10 includes a wireless device 110, a mobile switching center (MSC) 113, a wireless gateway 115, an intermediate network 128 (such as the Internet), a foreign network 116, a foreign mail server 108, and a foreign client 112. Wireless device 110 may be any wireless digital processor capable of accessing the Internet such as, for example, a mobile telephone, a personal digital assistant, or a pager such as those sold by Research in Motion (RIM) Inc.

Mobile switching center 113 may comprise anyone of a number of known communications switching devices, including those commonly used and known in the art for providing either digital or analog cellular telephone service to a plurality of wireless devices 110. The mobile switching center 113 performs switching functions to permit communication between the intermediate network 128 and the wireless device 110. Although only one mobile switching center 113 is shown, it will be understood that system 10 likely includes many more.

The wireless gateway 115 refers to a software infrastructure that connects the wireless domain (i.e. wireless device 110 and MSC 113) with the intermediate network 128. Each network in FIG. 1 may be running a different protocol. Message transfer among users that communicate with different protocols typically must be routed through a network gateway processor that transforms the message from the foreign protocol to the native protocol. Thus, gateways that are used for message transfer among interconnected networks, such as over what is commonly referred to as the "Internet," accept e-mail messages from other gateways and from connected networks.

In that regard, wireless gateway 115 carries out protocol conversions between WAP communication protocols and the Internet communication protocols (e.g. HTTP, TCP/IP). The underlying protocol for packaging and decoding messages sent by wireless device 110 and received by gateway 115 is Simple Mail Transport Protocol (SMTP). The gateway 115 also performs content encoding, such as encoding of WML into binary format and compilation of WMLScripts. Gateway 115 may reside within the wireless carrier's network but may also reside within a corporate business environment.

Figure 2:
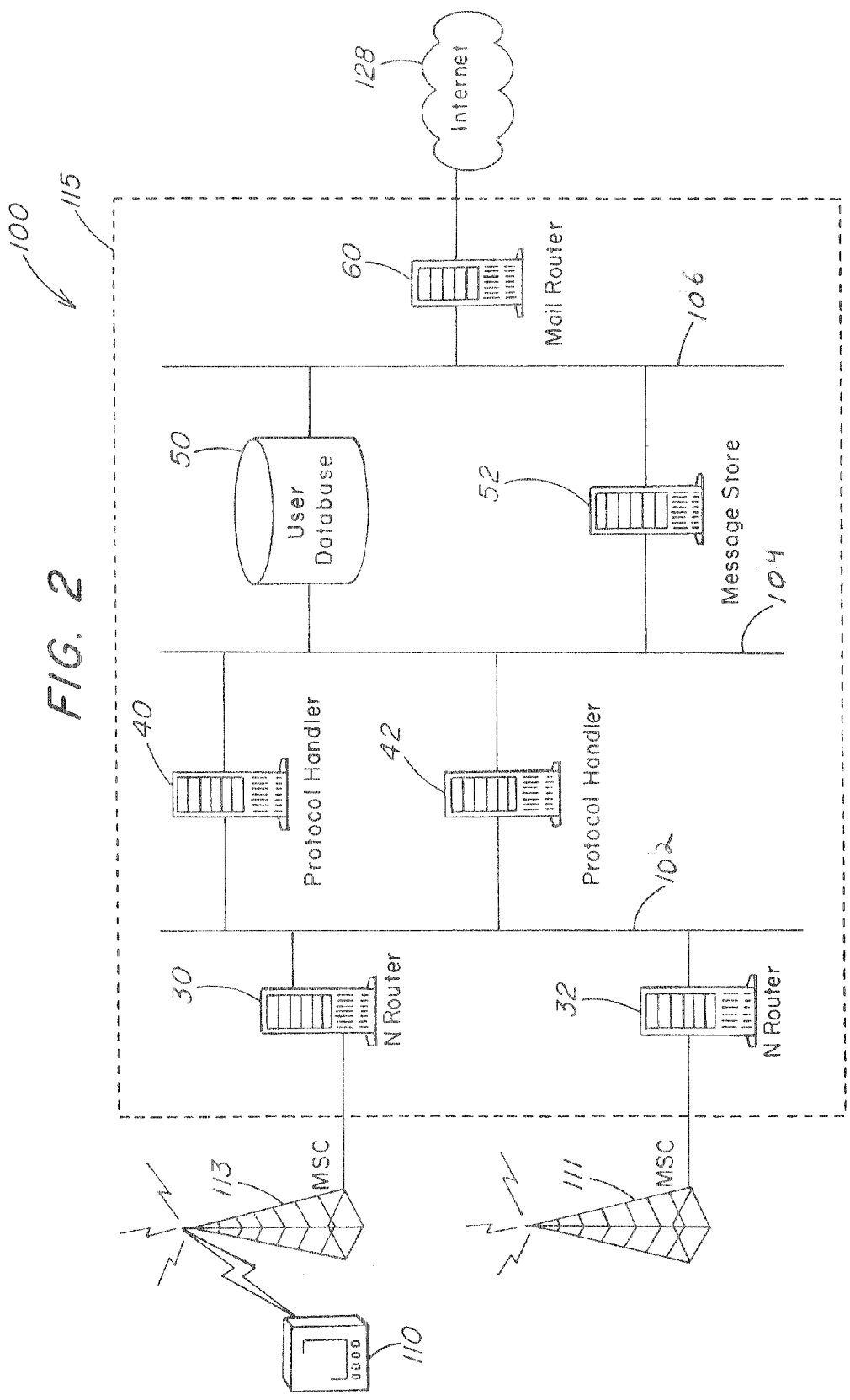
FIG. 2 is a simplified block diagram of an exemplary environment for operation of one embodiment of the present invention.

FIG. 2 shows a more detailed schematic of a wireless network 100, and especially gateway 115, according to one embodiment of the present invention. Network 100 includes wireless device 110, MSC 113, Nrouters 30 and 32, protocol handlers 40 and 42, a user database 50, a message store 52, and an Internet mail router 60. Wireless network 100 may use, for example, Mobitex® technology of the Cingular Interactive Intelligent Wireless Network service provided by Cingular Wireless. The Mobitex® network is a two-way wireless data service that can be connected with other complimentary networks. A wireless data service such as the Mobitex® network includes a hierarchy of communications systems that can provide nationwide wireless service through a network of base stations and local switches under the control of higher order regional switches or exchanges.

The components of gateway 115 may be connected over an internal network 102, 104, and 106, which may be a local area network (LAN). One or more wireless network exchanges such as Mobitex® regional switches 111 and 113, which may reside at separate locations, communicate with gateway 115 through Nrouters 30 and 32. The communication between regional switch 113 and the Nrouters may use, for example, an X.25 protocol. Nrouters 30 and 32, in turn, communicate with protocol handlers 40 and 42 over internal network 102 using, for example, X-sockets.

Protocol handlers 40, 42 use data from user database machine 50 to communicate externally to gateway 115 via network 106. An Internet mail router 60 is connected to internal network 106 and handles inbound and outbound communications traffic with an external network such as the Internet 128, as well as X-sockets traffic. If necessary, a separate X-sockets machine and backup machine (not shown) can be added.

Protocol handlers 40 and 42 process information contained in user database machines, such as user database 50. Additionally, each protocol handler maintains a database cache, i.e., a small, fast memory holding recently accessed data, to speed up internal network communications and to limit database access requests over the LAN. The protocols handled by protocol handlers 40, 42 specify that message storage and internal email access may be handled by the UNIX standard Network File System (NFS) distributed file system from SUNSOFT, which allows data to be shared across the network regardless of the protocol.

Message store 52 is responsible for, among other things, delivering a mail message to a recipient or receiving a mail message from a sender. Thus, message store 52 may contain various routing and delivery program modules necessary to ensure that a mail message is either delivered to a recipient, or forwarded to other components for delivery to a recipient.

According to an embodiment of the present invention, message store 52 includes a module to control mail messages sent from wireless network 104. Such a module may be implemented using hardware or software. Those skilled in the art will appreciate, however, that the process described below may be implemented at any level, ranging from hardware to application software and in any appropriate physical location. For example, the module may be implemented as software code to be executed by the message store 52 using any suitable computer language such as, for example, microcode, and may be stored in, for example, an electrically erasable programmable read only memory (EEPROM). According to another embodiment, the module may be implemented as software code to be executed using any suitable computer language such as, for example, Java, Perl, C or C++ using, for example, conventional or object-oriented techniques. The software code may be stored as a series of instructions or commands on a computer readable medium, such as random access memory (RAM), read only memory (ROM), a magnetic medium such as a hard-drive or a floppy disk, or an optical medium such as CD-ROM. The module may also be a computer, such as a workstation or a personal computer, a microprocessor, a network server, a Java virtual machine, or an application specific integrated circuit, using any suitable type of computer instruction.

In many instances, mail messages and other information that are routed through wireless network 100 may be thought of as a collection of properties. If each mail message is conceptually thought of as a collection of various properties, then the properties may be stored and manipulated. For example, message store 52 may comprise means for storing information so that it can be retrieved later. In one embodiment, message store 52 comprises a database engine that will take properties and store them. Such an approach may be highly useful, for example, for storing either temporarily or on a more permanent basis various mail and other information.

Message store 52 may include a database, in the traditional sense of the word, or may be simply locations either in memory or on a mass storage device where information is stored until it needs to be retrieved. According to an embodiment, one or more program modules in message store 52 act as a data store manager that provides an interface to the storage medium. A component wishing to store information in message store 52 would submit the information to the appropriate program module and the program module would save the information to the storage medium. Information may be retrieved in a similar manner. According to an embodiment, such a data store program module is adapted to store message identifiers.

According to one embodiment of the present invention, gateway 115 can implement a set of policies to prevent unauthorized forwarding of email messages that pass through gateway 115. For example, users can establish a default policy that is applied to email messages. Alternatively, users could request that certain policies be applied on a per-message basis. Additionally, these policies could be changed at gateway 115 even after a message has been delivered. By implementing the present invention at gateway 115, the non-forwarding feature is completely transparent to users and requires no special plug-ins or other software to be deployed on individual client devices. Additionally, these features may be entirely user-initiated and user-controlled.

According to one embodiment, users can specify policies on a per-message basis by embedding keywords or commands in the body of the messages. These commands may generate mail headers that, in turn, instruct gateway 115 to control distribution of the associated message. According to such an embodiment, the keywords may be implemented as dot commands. Dot commands take the form of a line beginning with a period, followed by one or more letters. Where the message can be placed in the body of the text message itself, it may be recognized by any interactive wireless system protocol. The text message and related commands may be created and specified, e.g., using any Internet-compatible email service such as Microsoft Outlook.

Figure 3:
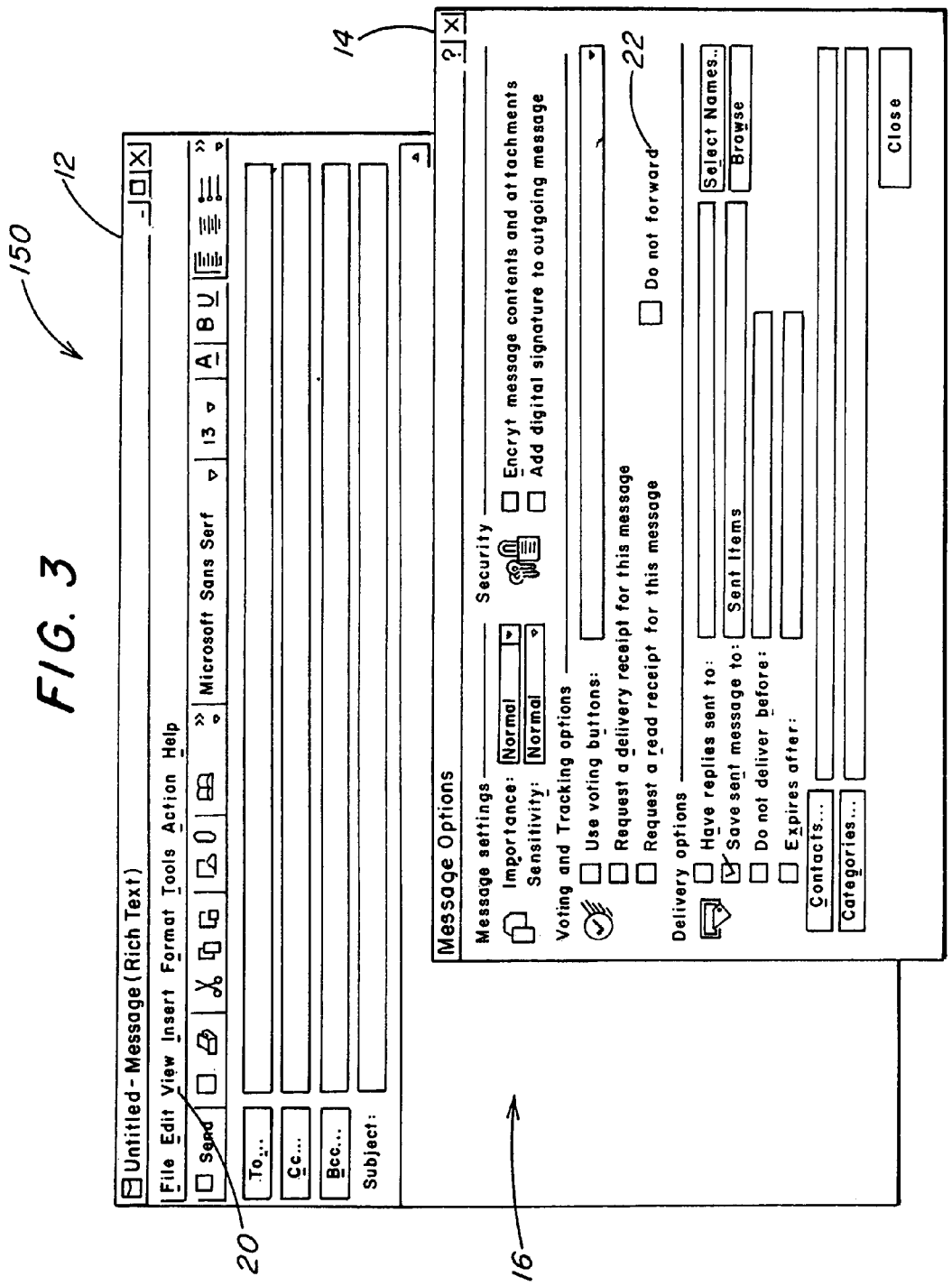
FIG. 3 is a diagram illustrating a message window displayed by an exemplary electronic mail system.

FIG. 3 illustrates an embodiment of a user interface 150 with which users can activate the non-forwarding feature. User interface 150 includes a new message window 12 and a message options window 14 according to an embodiment of the present invention. New message window 12 allows a user to compose a new message 16 in a conventional manner. Options window 14 allows a sender to provide certain instructions to the system 10 in connection with the delivery of the message composed in message window 12. To display the options window 14, the sender typically selects Options (not shown) from a View menu 20. The new message window 12 and options window 14 represent Microsoft Outlook 2000® windows for illustration purposes. Those skilled in the art will recognize, however, that these examples do not limit the invention to a particular electronic mail system, but that the invention is applicable to any electronic mail system.

According to such an embodiment, the sender may block forwarding of the message 16 by selecting a "do not forward" option 22. According to such an embodiment, the sender may activate the "do not forward" option under, for example, the voting and tracking options section of message options window 14. The "do not forward" option 22 must be checked before the message is sent to activate the anti-forwarding functionality. Once activated, recipients of message 16 will be permitted to read message 16 but not forward it through gateway 115. According to another embodiment, certain controls necessary to activate the present invention could be located in the user's email toolbar.

According to one embodiment of the present invention, gateway 115 consults a database of blacklisted message identifiers to determine whether the sender had requested the non-forwarding feature. In other words, gateway 115 could be configured to look up the message identifier of a forwarded email message, and reject the forwarded message if the blacklist database indicates that the message identifier has an active non-forwarding option. According to such an embodiment, a message identifier may be, for example, an identification string derived from the SMTP header of the message itself that uniquely identifies the message.

FIG. 4 is a simplified flow diagram that illustrates a process 200 for controlling the distribution of electronic mail according to an embodiment of the present invention. FIG. 4 is entered at step 210, and in step 212, a wireless subscriber (hereafter "the sender") uses wireless device 110 to compose and transmit an electronic message 16 in a conventional manner. Message 16 is sent from the wireless device 110 to gateway 115 using wireless session protocols, essentially a binary version of HTTP. In step 214, gateway 115 determines whether the sender has requested that message 16 not be forwarded. If so, in step 216, gateway 115 stores the message identifier associated with message 16 in a storage medium 218. Message 16 then works its way through system 10, as shown in FIG. 1, in a manner well know to those skilled in the art until it reaches client device 112 of the addressee or message recipient in step 220.

If the recipient forwards message 16 to a third party in step 222, gateway 115 will interrupt the process and read the message identifier associated with message 16 and, in step 224, search storage medium 218 for a matching entry. If, in step 226, message 16 has an active non-forwarding request (i.e., gateway 115 finds a matching entry in storage medium 218), gateway 115 blocks forwarding of message 16 in step 228 and, optionally, notifies the sender of the forwarded message in step 230 before proceeding to an end in step 232. If no matching entry is found in storage medium 218, gateway 115 routes message 16 in a conventional manner in step 234.

The present invention has been described with reference to the SMTP mail protocol and the wireless application protocol (WAP) standards as a basis for transmitting electronic mail from a wireless device. It will be recognized, however, that these standards are used by way of example only, and that the concepts utilized here are equally applicable in other environments that do not operate in accordance with these particular standards.

It should also be understood that the invention is not limited by the foregoing description, but embraces all such alterations, modifications, and variations in accordance with the spirit and scope of the appended claims.

What is claimed is:

1. A method for detecting and selectively preventing the forwarding of an electronic message after receipt by the recipient, wherein the electronic message has a unique message identifier, the method comprising:

coding the body of the electronic message in response to a user request while the electronic message is being composed in a messaging application, before the user clicks the send command and before being sent from the messaging application to indicate a request to prevent forwarding;

scanning the electronic message by a gateway for the request to prevent forwarding;

storing the message identifier in a blacklist database by the gateway whenever the request is found;

blocking, by the gateway, the forwarding of the electronic message after the electronic message has been received by the recipient when the message identifier of the electronic message being forwarded by the recipient matches an entry in the blacklist database; and notifying the user, by the gateway, of an attempt to forward.

2. The method of claim 1, wherein the electronic message includes a message body, and wherein scanning includes searching the message body for a request to prevent forwarding.

3. The method of claim 2, wherein the electronic message includes a message header, and wherein scanning includes searching the message header for a request to prevent forwarding.

4. The method of claim 3, further comprising:
selecting the electronic message in which to include the request to prevent forwarding.

5. A system for detecting and selectively preventing the forwarding of an electronic message received by a recipient, wherein the electronic message has a unique message identifier, the system comprising:

means for coding the body of the electronic message in response to a user request while the electronic message is being composed in a messaging application, before the user clicks the send command and before being sent from the messaging application to indicate a request to prevent forwarding;

means for scanning the electronic message by a gateway for the request to prevent forwarding;

means for storing the message identifier in a blacklist database by the gateway whenever the request is found;

means for blocking by the gateway, the forwarding of the electronic message that has been received by the recipient whenever the message identifier of the electronic message being forwarded by the recipient matches an entry in the blacklist database; and means for notifying the user, by the gateway, of an attempt to forward.

6. The system of claim 5, wherein the electronic message includes a message body, and wherein the means for scanning includes searching the message body for a request to prevent forwarding.

7. The system of claim 6, wherein the electronic message includes a message header, and wherein the means for scanning includes searching the message header for a request to prevent forwarding.

8. The system of claim 7, further comprising:
means for selecting the electronic message in which to include the request to prevent forwarding.

9. A computer-readable medium having stored thereon instructions which, when executed by a processor, cause the processor to perform the steps of:

coding the body of an electronic message in response to a user request while the electronic message is being composed in a messaging application, before the user clicks the send command and before being sent from the messaging application to indicate a request to prevent forwarding;

scanning an electronic message by a gateway for the request to prevent forwarding;

storing a message identifier in a blacklist database by the gateway whenever the request is found;

blocking, by the gateway, forwarding of the electronic message once the electronic message has been received by a recipient whenever the message identifier of the electronic message being forwarded by the recipient matches an entry in the blacklist database; and notifying the user, by the gateway, of an attempt to forward.

10. The medium of claim 9, wherein the electronic message includes a message body, and wherein scanning includes searching the message body for a request to prevent forwarding.

11. The medium of claim 10, wherein the electronic message includes a message header, and wherein scanning includes searching the message header for a request to prevent forwarding.

12. The medium of claim 11, further comprising:

selecting the electronic message in which to include the request to prevent forwarding.

\* \* \* \* \*